United States Patent
Zheng (10) Patent No.: US 10,346,524 B1
(45) Date of Patent: Jul. 9, 2019

(54) POSITION-DEPENDENT WORD SALIENCE ESTIMATION

(71) Applicant: SAP SE, Walldorf (DE)

(72) Inventor: Xin Zheng, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/940,041

(22) Filed: Mar. 29, 2018

(51) Int. Cl.
*G06F 17/22* (2006.01)
*G06F 17/27* (2006.01)

(52) U.S. Cl.
CPC ...... *G06F 17/2264* (2013.01); *G06F 17/2785* (2013.01)

(58) Field of Classification Search
CPC .................. G06F 17/2785; G06F 17/2264
See application file for complete search history.

(56) References Cited

U.S. PATENT DOCUMENTS

| | | | | |
|---|---|---|---|---|
| 6,236,768 B1 * | 5/2001 | Rhodes | ............... | G06F 16/907 382/306 |
| 6,810,376 B1 * | 10/2004 | Guan | ............... | G06F 17/2785 704/9 |
| 2008/0221878 A1 * | 9/2008 | Collobert | ............ | G06F 17/2785 704/232 |
| 2011/0196859 A1 * | 8/2011 | Mei | ............... | G06F 16/248 707/723 |
| 2019/0065471 A1 * | 2/2019 | Comeau | ............... | G06F 16/313 |

OTHER PUBLICATIONS

U.S. Appl. No. 15/623,071, Zheng, Xin, filed Jun. 14, 2017.

* cited by examiner

*Primary Examiner* — Asher D Kells
(74) *Attorney, Agent, or Firm* — Fish & Richardson P.C.

(57) ABSTRACT

Methods, systems, and computer-readable storage media for receiving two or more electronic documents, each electronic document including text data, a second electronic document including a link to a first electronic document, processing word representations of words of the first electronic document using a first encoder to provide first output and a context vector, processing text data of the second electronic document and the context vector using a first decoder to provide second output, determining, by an attention mechanism, a plurality of weights for each word in the text data of the first electronic document based on the first output, and the second output, and providing a word salience value for each word, a word salience value comprising a sum of weights of a respective word.

20 Claims, 4 Drawing Sheets

POSITION-DEPENDENT WORD SALIENCE ESTIMATION

BACKGROUND

Information retrieval systems can be used to identify electronic documents (e.g., books, papers, web pages, in electronic form) that may be relevant to users. For example, a user can submit a query to an information retrieval system, and electronic documents determined to be relevant to the query can be provided to the user. In some systems, electronic documents can be summarized. In this manner, a summary (e.g., abstract) of an electronic document can be provided to a user, for example, such that the user can determine whether the electronic document is of interest.

Such systems can identify, and/or summarize electronic documents based on words present in the document. For example, a query to an information retrieval system can include one or more words, and the information retrieval system returns electronic documents that include the one or more words. In some instances, electronic documents can be ranked, or otherwise selected for return to the user. In some examples, the relative importance of a word within an electronic document, referred to as word salience, can be used to discern between electronic documents. For example, a word can have a first word salience with respect to a first electronic document, and a second word salience with respect to a second electronic document, the first word salience being greater than the second word salience. Consequently, the first electronic document may be determined to be more relevant, and can be ranked higher in results than the second electronic document.

Traditionally, word salience is based on a single value for a respective electronic document. For example, word salience of a word can be determined based on term frequency-inverse document frequency (TFIDF), which provides a word salience value that increases proportionally to the number of times the word appears in the document, and is offset by the frequency of the word in the document. Such techniques, however, fail to account for the relative importance of words in different sentences of the document. For example, a word may be less important in one sentence than in another sentence within the same document.

SUMMARY

Implementations of the present disclosure include computer-implemented methods for determining word salience in text data. More particularly, implementations of the present disclosure are directed to computer-implemented methods for providing position-dependent word salience for words in text data. In some implementations, actions include for receiving two or more electronic documents, each electronic document including text data, a second electronic document including a link to a first electronic document, processing word representations of words of the first electronic document using a first encoder to provide first output and a context vector, processing text data of the second electronic document and the context vector using a first decoder to provide second output, determining, by an attention mechanism, a plurality of weights for each word in the text data of the first electronic document based on the first output, and the second output, and providing a word salience value for each word, a word salience value comprising a sum of weights of a respective word. Other implementations of this aspect include corresponding systems, apparatus, and computer programs, configured to perform the actions of the methods, encoded on computer storage devices.

These and other implementations can each optionally include one or more of the following features: the first encoder includes a recurrent neural network (RNN) encoder, and the first decoder includes a RNN decoder; actions further include providing a reconstruction of the first electronic document using a variational autoencoder to provide a comparison hidden vector for a reconstruction regularizer; the reconstruction regularizer supplements missing information in the second electronic document, and reduces an effect of noise from the second electronic document; actions further include using word salience values in a system to perform one or more of retrieval of electronic documents, and summarization of electronic documents on word salience values; each word representation includes a distributed word vector mapped by a word embedding matrix that is initialized by pre-trained word embeddings; and the first electronic document includes an article, the second electronic document includes a social media post.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for determining word salience in text data. More particularly, implementations of the present disclosure are directed to computer-implemented methods for providing position-dependent word salience for words in text data. Implementations can include actions of receiving two or more electronic documents, each electronic document including text data, a second electronic document including a link to a first electronic document, processing word representations of words of the first electronic document using a first encoder to provide first output and a context vector, processing text data of the second electronic document and the context vector using a first decoder to provide second output, determining, by an attention mechanism, a plurality of weights for each word in the text data of the first electronic document based on the first output, and the second output, and providing a word salience value for each word, a word salience value comprising a sum of weights of a respective word.

Figure 1:
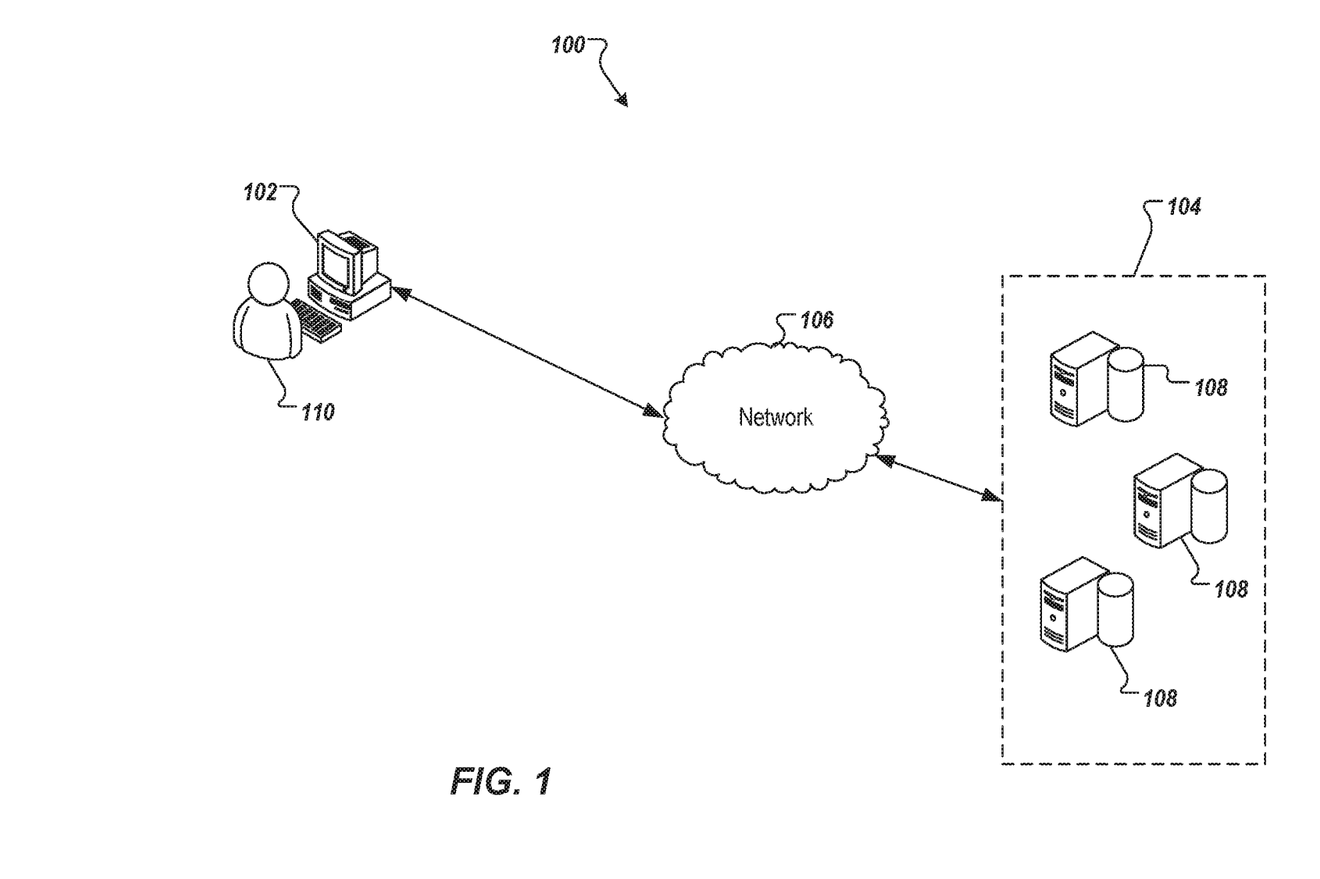
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a position-dependent word salience service (e.g., provided as one or more computer-executable programs executed by one or more computing devices). For example, input data (text data, secondary data) can be provided to the server system (e.g., from the client device 102), and the server system can process the input data through the position-dependent word salience service to provide result data. For example, the server system 104 can send the result data to the client device 102 over the network 106 for display to the user 110.

As introduced above, information retrieval systems, document summarization systems, and the like can use word salience to perform their functions. Traditional techniques for determining word salience, however, can be inexact. For example, such techniques do not account for the relative importance that a word may have in different sentences of an electronic document. Consequently, the results of the systems (e.g., electronic documents returned in response to a query) can be inexact (e.g., electronic documents that are not necessarily relevant to a query are returned). This can result in system inefficiencies (e.g., inefficient use of technical resources (processors, bandwidth, memory)) as users interact with the systems to obtain the results they seek.

In view of the foregoing, implementations of the present disclosure are directed to position-dependent word salience score determination. More particularly, implementations of the present disclosure provide word salience determination based on the differing importance a word may have in different sentences of an electronic document. To this end, implementations of the present disclosure provide word salience scores for words in text data (e.g., electronic documents) based on secondary data having an association with the text data. Implementations of the present disclosure are described in further detail herein with reference to an example context. The example context includes the text data being provided as news articles published online, and each being associated with a respective uniform resource locator (URL). Further, in the example context, the secondary data is provided as social media data. In some examples, the social media data is associated with articles based on the URLs of the articles. For example, the social media data includes a URL of a respective article.

Example social media data can include, but is not limited to, social media posts (e.g., Twitter posts (tweets), Facebook posts). In the example context, tweets are used to illustrate implementations of the present disclosure. In some examples, tweets with URLs linking to articles are referred to herein as linking tweets. In some examples, linking tweets are more likely to have been generated in response to the respective article. Consequently, linking tweets should be able to reflect reader interest in the articles. In the example context, implementations of the present disclosure provide word salience scores based on both the readers interest, and relevant information in the articles.

As described in further detail herein, implementations of the present disclosure provide position-dependent word salience estimation for words in text data. More particularly, implementations of the present disclosure include attentive information extraction, and reconstruction regularization. In some implementations, the attentive information extraction incorporates the secondary data (linking tweets) into the position-dependent word salience estimation. However, the secondary data does not cover all of the information in the text data (articles), and may also include noise. In some implementations, the reconstruction regularization supplements such missing information, and reduces the effect of noise in the secondary data.

Figure 2:
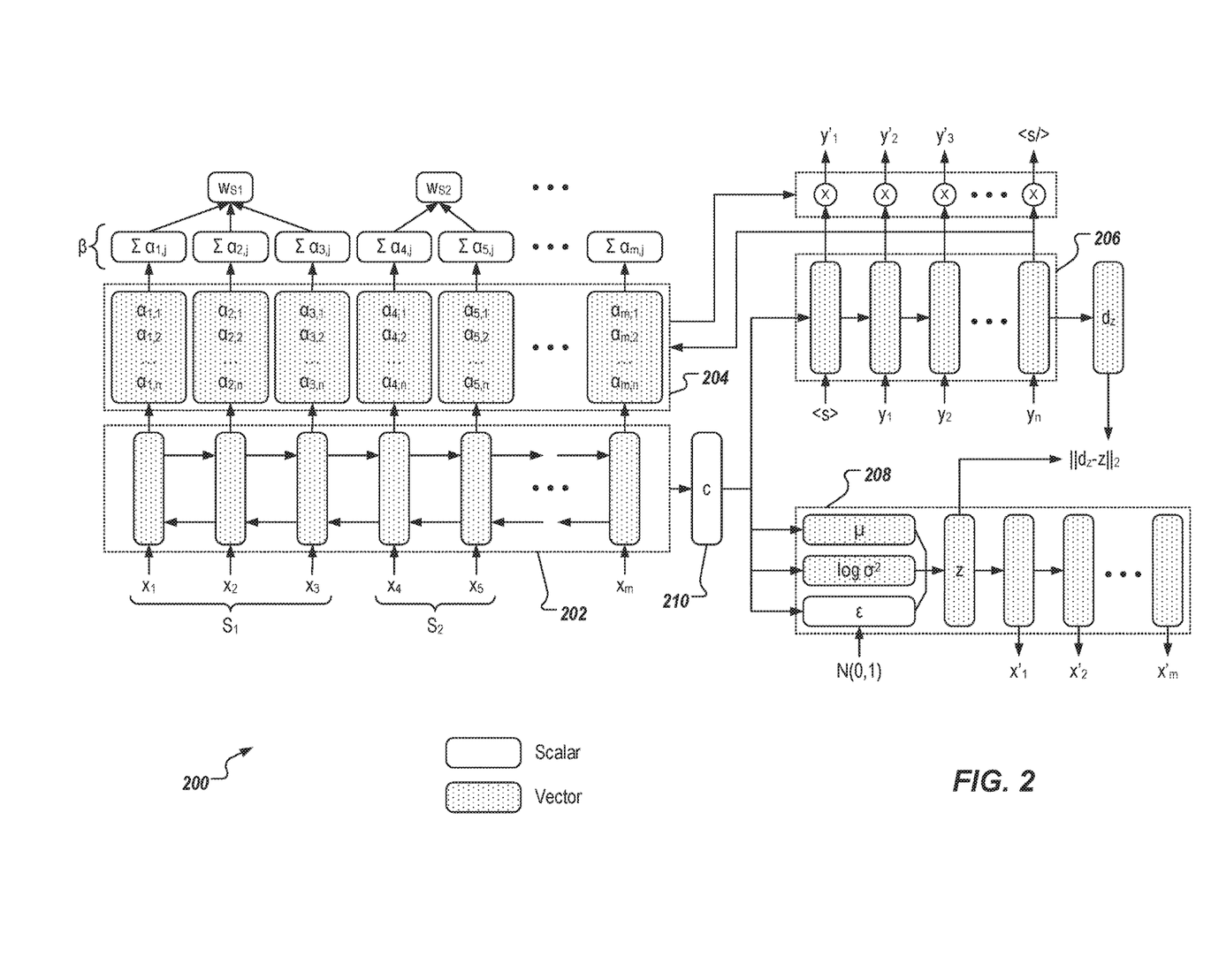
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a first encoder 202, an attention module 204, a first decoder 206, and a second decoder 208. In some implementations, the first encoder 202 is provided as a recurrent neural network (RNN) encoder. In some examples, the first encoder 202 is provided as a bidirectional Gated Recurrent Unit (GRU). As described in further detail herein, the first encoder 202 receives text data (article) as input, and provides a contextual vector 210. In some implementations, the first decoder 206 is provided as a RNN decoder. In some examples, the first decoder 206 is provided as a bidirectional GRU. In some implementations, the second decoder 208 is provided as a RNN variable autoencoder (VAE) decoder.

With regard to attentive information extraction, a recurrent sequence-to-sequence framework is used to model the correlation between the text data (articles) and the secondary data (linking tweets). In the example context, an article and a linking tweet are a pair. The article is provided as input to the first encoder 202, and the corresponding linking tweet (in the article, linking tweet pair) is provided as input to the first decoder 206.

In further detail, each article (e.g., document D) is composed of a sequence of sentences (s), which can be represented as:

$$D=\{s_q|q\in[1,|D|]\}$$

In some examples, each sentence includes a sequence of words (x), which can be represented as:

$$s_q=\{x_i|i\in[1,|\mathcal{V}|]\}$$

where a vocabulary V includes all of the words from both articles, and linking tweets. In some examples, the vocabulary includes all words from the articles, and linking tweets including stop words. In this manner, the structure of each sentence can be determined. For example, stop words can also be included as input for encoders and decoders.

In some implementations, sentences in each article are concatenated in order as one sequence. In this manner, the input to each unit of the GRU (the first encoder 202) is a word representation. In some examples, each word is represented by a distributed word vector mapped by a word embedding matrix E, which is initialized by pre-trained Word2Vec embeddings on both articles, and tweets. Word2vec can be described as a group of related models that are used to produce word-vectors (also referred to as word embeddings). In some examples, each word-vector has multiple dimensions (e.g., hundreds of dimensions). More particularly, Word2vec can be described as an efficient implementation of the continuous bag-of-words (CBOW) model, or continuous skip-gram model for computing vector representations of words (i.e., word-vectors). In general, Word2vec takes a text corpus as input, and produces the word-vectors as output by constructing a vocabulary from the text data, and learning vector representations of words. More specifically, each unique word in the text corpus is assigned a corresponding vector within a vector space. Word-vectors are positioned in the vector space such that words that share common contexts in the text corpus are located in close proximity to one another in the vector space.

In some implementations, the word embeddings are trained together with the model. At each position of the GRU unit, hidden representations in both directions are provided, and are concatenated as a hidden vector at each step. This can be represented as:

$$h_i^{enc} = \left[ \overrightarrow{h_i}^T ; \overleftarrow{h_i}^T \right]^T$$

The hidden representation at the last step is considered as the contextual vector c (the contextual vector 210 of FIG. 2).

In some implementations, the first decoder 206 provides predicted words that share the same embedding matrix E as the input to the first encoder 202. At a training stage, the linking tweets are provided as inputs to the first decoder 206, and are processed to learn decoding targets. In some examples, the symbol ⟨s⟩ is added before the first word $y_1$ of each linking tweet to represent the beginning of a sentence. The decoding target is the linking tweet itself, and the symbol ⟨s/⟩ is added after the last word $y_n$ of the linking tweet to denote the end of the sentence. At each step of the decoding process, the hidden representation is generated from the previous hidden representation, the previous output, and the encoder contextual vector, which can be represented as:

$$h_j^{dec}=f(y_{j-1},h_{j-1}^{dec},c)$$

In some implementations, at the first step of decoding process, the encoder contextual vector c acts as the previous hidden representation. At the training stage, the previous output is the previous word in the decoder input. The decoder target is used to calculate the loss with the predicted results.

The RNN, however, can suffer from remembering relatively long sequence information. Accordingly, implementations of the present disclosure provide the attention module 204 to alleviate the heavy burden, and address different relevancies among encoder states to predict the decoder targets. Instead of generating decoder targets according to a static encoder contextual vector c at each decoder step, a different encoder context vector $c_j$ is provided based on the relationship between each encoder hidden state and the previous decoder state. This can be represented as follows:

$$P(y_j|y_1,\ldots,y_{j-1},x) = g(y_{j-1}, h_j^{dec}, c_j) \quad (1)$$

$$h_j^{dec} = f(y_{j-1}, h_{j-1}^{dec}, c_j)$$

$$c_j = \sum_{i=1}^{m} \alpha_{ij} h_i^{enc}$$

$$\alpha_{ij} = \frac{\exp(e_{ij})}{\sum_{k=1}^{m} \exp(e_{ik})}$$

$$e_{ij} = v_a^T \tanh(W_e h_i^{enc} + W_d h_{j-1}^{dec})$$

where $W_e$ and $W_d$ are trainable parameters. The probability of the predicted word in step j is acquired from a softmax operation on the final layer representation of decoder state j, whose dimension is the same as the vocabulary size $|\mathcal{V}|$. The objective function for the sequence-to-sequence framework could be defined as negative log likelihood, and can be represented as:

$$\mathcal{L}_S = -\Sigma_{(X,Y)\in D} \log p(Y|X;\theta)$$

In accordance with implementations of the present disclosure, a word salience score is determined by taking the relationship between the linking tweet, and the article into consideration. In some examples, it is assumed that the relative importance of each word is different in different sentences (i.e., with different contextual information). Consequently, implementations of the present disclosure construct a position-dependent word salience score, instead of estimating one single salience score for each word. This could be well estimated by the attention weights from the presented framework. The attention weight $\alpha_{ij}$ describes the alignment relationship of each word in an article, and that in the linking tweet at each position. Specifically, the relationship takes the contextual information around the word into consideration, which is encoded in the hidden vector. To obtain a synthetic salience score for each word $x_i$ in the article at different positions, the relative salience scores of $x_i$ is summed over all the words $x_i$ in the linking tweet. This can be represented as:

$$\beta_i = \Sigma_{j=1}^n \alpha_{ij}$$

The importance of each word to different linking tweets is different. Because a synthetic word salience value is to be obtained, the relative word salience scores are not recorded at training stage. After the model converges to a stable state, each article is processed in the inference process, and the score $\beta_i$ is provided as the synthetic position-dependent salience score for word $x_i$ with respect to the whole tweet set. Actually, word salience score is not only estimated according to the relationship between tweets and articles, but is also influenced by the reconstruction regularization of the present disclosure.

With regard to the reconstruction regularization, and as noted above, the linking tweets do not cover all of the information in a respective article, and may also include additional (noisy) words. To supplement the missing information not covered by tweets, and to reduce the effect of noise, the present disclosure implements reconstruction regularization. In some implementations, the reconstruction regularization is composed of multiple parts. Example parts include articles reconstruction, and tweet-article reconstruction.

In some implementations, article reconstruction is used to generate a comparison hidden vector for tweet-article reconstruction regularizer, and to avoid learning of encoder parameters in the attentive information extraction module dominated by tweets. For article reconstruction, implementations of the present disclosure can apply a variational autoencoder, which is an efficient approach to rebuild the input through reparameterization trick. In some implementations, the variational autoencoder (VAE) includes an encoder, and decoder. To make the article reconstruction influence the word salience scores learning, the variational encoder shares the same embedding matrix E. The encoder contextual vector c is fed into the decoder.

The objective for variational autoencoder is to reproduce the original input, which can be formulated as:

$$p_\theta(x) = \int p_\theta(x|z) p_\theta(z) dz \quad (4)$$

where $z \in \mathbb{R}^K$ is the hidden representation vector, which can reconstruct the input x. By introducing a recognition model $q_\varphi(z|x)$ to approximate the posterior $p_\theta(z|x)$, the lower bound of the objective can be provided as:

$$\mathcal{L}_v = \log p_\theta(x) - D_{KL}[q_\varphi(z|x) \| p_\theta(z|x)] = \mathbb{E}_{z \sim q}[\log p_\theta(x|z)] - D_{KL}[q_\varphi(Z) \| p_\theta(Z)]. \quad (5)$$

where $D_{KL}$ denotes Kullback-Leibler divergence. The value $D_{KL}[q_\varphi(z|x) \| p_\theta(z|x)]$ can be made small, and the parameters $\theta$ and $\varphi$ can be jointly learned.

Using the parameters provided herein, the above loss function can be rewritten as:

$$\mathbb{E}_{z \sim q}[\log p_\theta(x|z)] = -\sum_{X \in D} \log p(X' | X; \theta, \varphi) \quad (6)$$

$$D_{KL}[q_\varphi(z) \| p_\theta(z)] = -\frac{1}{2} \sum_{i=1}^K (1 + \log(\sigma_i^2) - \mu_i^2 - \sigma_i^2)$$

Both prior and posterior of the latent variables can be assumed to have a Gaussian distribution, as follows:

$$p_\theta(z) \sim \mathcal{N}(0, I), q_\varphi(z|x) \sim \mathcal{N}(z; \mu, \sigma^2 I). \quad (7)$$

The mean $\mu$ and the standard deviation $\sigma$ can be computed from the encoder contextual vector c, through a linear layer. For example:

$$\mu = W_{c\mu} c + b_{c\mu}$$

$$\log(\sigma^2) = W_{c\sigma} c + b_{c\sigma} \quad (8)$$

In some implementations, the latent vector z is obtained through reparameterization based on the estimated $\mu$ and $\sigma$, which can be represented as:

$$z = \mu + \varepsilon \sigma. \quad (9)$$

where $\varepsilon \sim \mathcal{N}(0, I)$ is a noise sampled from the Gaussian distribution.

In some implementations, using the latent vector z, the conditional probability $p_\theta(x|z)$ can be determined through a decoding process. Implementations of the present disclosure adopt the attentive GRU framework as the decoder (e.g., the RNN VAE decoder 208 of FIG. 2). The probability of the output word in the prediction process is similar to that described above in Equation 1.

With regard to tweet-articles reconstruction, by exploring the relationship between articles and tweets, the important information in articles revealed by tweets can be addressed through the attention mechanism (e.g., the attention module 204 of FIG. 2). To some extent, a linking tweet can be considered a pseudo-summary of a respective article. A tweet is not a true summary, however, as it only partially covers the article information, and contains noise. In some implementations, a linking tweet is provided as an approximate summary in hidden vector space. Based on the idea of reconstruction, the hidden representations for a tweet and respective article are made closer. Because the article input can be reconstructed from the hidden representation of the article, at least a portion of, if not most of, the article can be rebuilt from the corresponding tweet representation. In this manner, the benefits of adding missing information from the article, and alleviating the effect of noise in tweets are provided.

In some implementations, the article hidden vector is represented by z, which can be used to reconstruct the article itself. The tweet hidden vector is reformulated from hidden vector $h_n^{dec}$ of the last step in the tweet decoder, which represents the tweet target. To make the two hidden vectors dimensions comparable, a linear layer is applied on $h_n^{dec}$, for example:

$$d_z = W_h h_n^{dec} + b_h \quad (10)$$

where $d_z$ is taken as the hidden vector for the tweet. A L2 norm is applied on the two hidden vectors to reduce the distance between them, and provide the tweet-article reconstruction regularizer as:

$$\mathcal{L}_r = \|d_z - z\|_2 \quad (11)$$

Based on backpropagation, the position-dependent word salience scores are learned through both attentive information extraction, and reconstruction regularization. Therefore, the position-dependent word salience estimation is based on both relationship between articles and tweets, and also from the article information. The training process works in a multi-task learning schema, because the sequence-to-sequence model and variational autoencoder model are trained together with different targets. The addition of the tweet-article regularizer results in a loss function provided as follows:

$$\mathcal{L} = \mathcal{L}_s + \mathcal{L}_v + \lambda \mathcal{L}_r \quad (12)$$

where $\lambda$ is a hyperparameter, which can be set based on experimental values.

In accordance with implementations of the present disclosure, one or more word salience values ($\beta$) are output for each word in the text data, each word salience value being dependent on the position of the respective word in a sentence. Consequently, each word can have multiple word salience values determined therefore. For example, a first word (x) can have a first word salience value ($\beta_1$) corresponding to a first sentence, and a second word salience value ($\beta_2$) corresponding to a second sentence. In some implementations, a sentence salience value (w) is determined based on the word salience values of the words included in the sentence. In some examples, a sentence salience value can be provided as a sum of the word salience values of the words within the sentence.

In some implementations, the word salience values, and/or the sentence salience values can be provided to one or more systems to improve operation of the systems. Using an information retrieval system as an example, electronic documents (e.g., articles) can be indexed, and associated with word salience values of words included in the electronic document. In response to a query, the information retrieval system can return results representative of one or more electronic documents at least partially based on the word salience values. For example, the query can include a word, which word can be indexed to multiple electronic documents. In some examples, an electronic document can be selected for the results, and/or ranked within the results relative to other electronic documents based on respective word salience values of the word. For example, a word can have a first word salience with respect to a first electronic document, and a second word salience with respect to a second electronic document, the first word salience being greater than the second word salience. Consequently, the first electronic document may be determined to be more relevant, and can be ranked higher in results than the second electronic document.

Accordingly, implementations of the present disclosure account for the relative importance that a word may have in different sentences of electronic documents. Consequently, the results returned by systems (e.g., electronic documents returned in response to a query) can be more precise than previously achievable (e.g., electronic documents that are more relevant to a query are returned). This can result in system efficiencies (e.g., efficient use of technical resources (processors, bandwidth, memory)) as users interact with the systems to obtain the results they seek.

Figure 3:
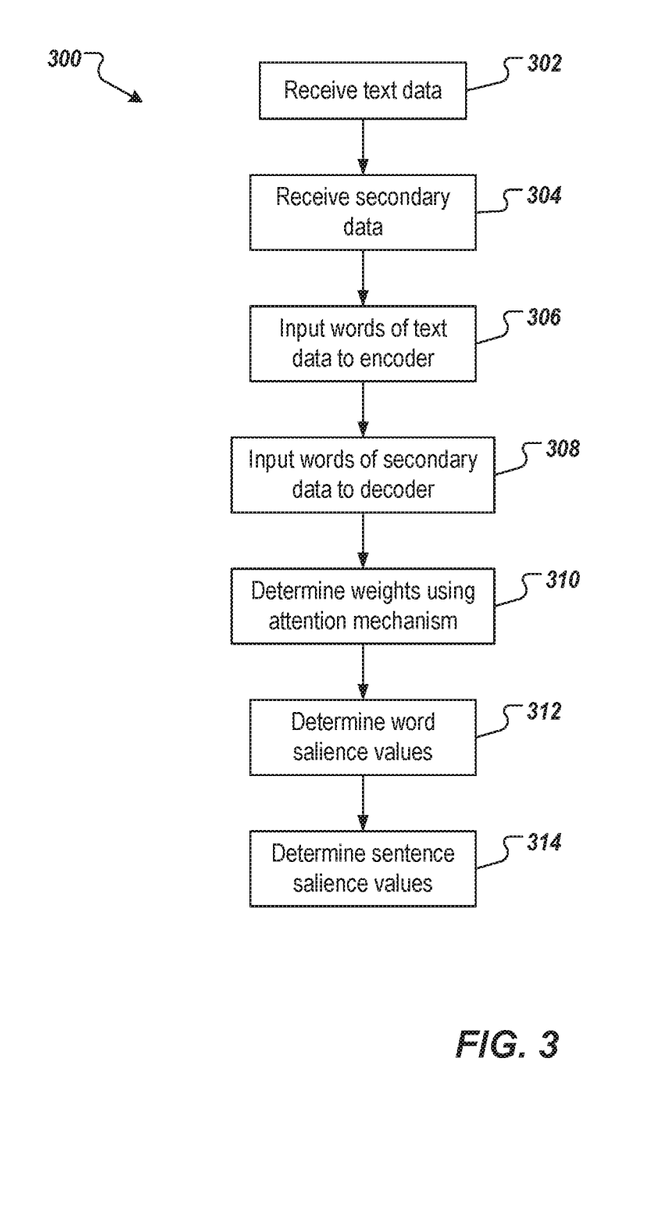
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices.

Text data is received (302). For example, text data can be provided from an electronic document (e.g., news article). Secondary data is received (304). For example, the secondary data can be provided as electronic documents that are associated with the text data. In some examples, the secondary data includes an electronic document (e.g., tweet) that includes a link (hyperlink) to the text data. Words of the text data are input to an encoder (306). For example, and as described herein, words of the text data are provided as input to a RNN encoder (e.g., the first encoder 202 of FIG. 2). The RNN encoder processes the words to provide the context vector c (e.g., the context vector 210 of FIG. 2), and outputs to the attention mechanism (e.g., the attention module 204 of FIG. 2).

Words of the secondary data are provided as input to a decoder (308). For example, and as described herein, words of the secondary data are provided as input to an RNN decoder (e.g., the first decoder 206 of FIG. 2). Further, the context vector c is provided as input to the RNN decoder, which processes the words of the secondary data based on the context vector c to provide output for determining weights of words. A set of weights is determined for each word using an attention mechanism (310). For example, and as described herein, output of the RNN encoder, and of the RNN decoder are provided as input to an attention module (e.g., the attention module 204 of FIG. 2), which provides a set of weights for each word, as described herein. Word salience values are determined (312). For example, for each word, a word salience value is provided as the sum of weights in the set of weights determined for the respective word. Sentence salience values are determined (314). For example, for each sentence, a sentence salience value is provided as the sum of weights of the words that are included in the sentence.

Figure 4:
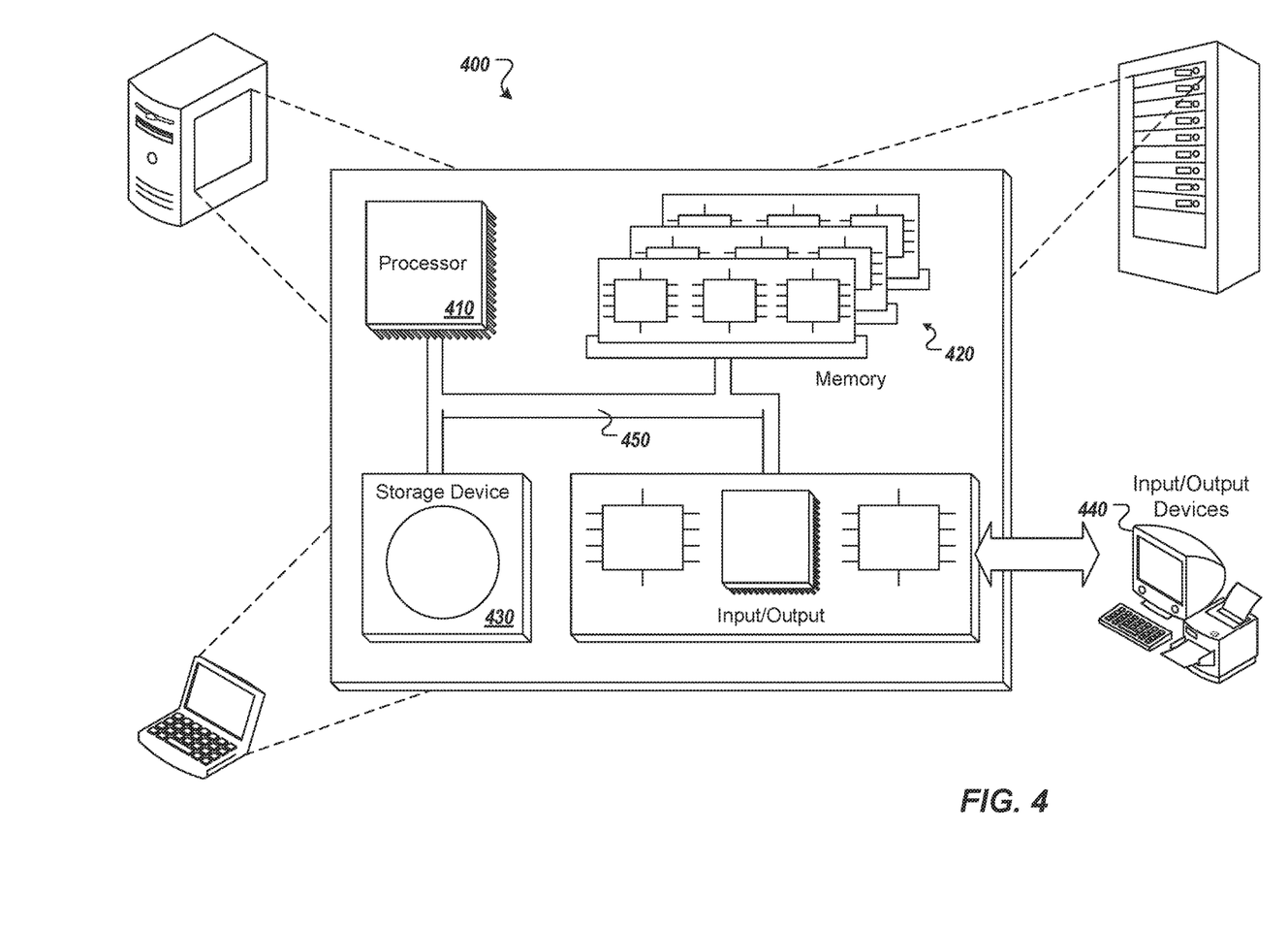
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for word salience determination of words in text data, the method being executed by one or more processors and comprising:

receiving, by the one or more processors, two or more electronic documents, each electronic document comprising text data, a second electronic document comprising a link to a first electronic document;

processing, by the one or more processors, word representations of words of the first electronic document using a first encoder to provide first output and a context vector;

processing, by the one or more processors, text data of the second electronic document and the context vector using a first decoder to provide second output;

determining, by an attention mechanism executed by the one or more processors, a plurality of weights for each word in the text data of the first electronic document based on the first output, and the second output; and providing, by the one or more processors, a word salience value for each word, a word salience value comprising a sum of weights of a respective word.

2. The method of claim 1, wherein the first encoder comprises a recurrent neural network (RNN) encoder, and the first decoder comprises a RNN decoder.

3. The method of claim 1, further comprising providing a reconstruction of the first electronic document using a variational autoencoder to provide a comparison hidden vector for a reconstruction regularizer.

4. The method of claim 3, wherein the reconstruction regularizer supplements missing information in the second electronic document, and reduces an effect of noise from the second electronic document.

5. The method of claim 1, further comprising using word salience values in a system to perform one or more of retrieval of electronic documents, and summarization of electronic documents on word salience values.

6. The method of claim 1, wherein each word representation comprises a distributed word vector mapped by a word embedding matrix that is initialized by pre-trained word embeddings.

7. The method of claim 1, the first electronic document comprises an article, the second electronic document comprises a social media post.

8. A non-transitory computer-readable storage medium coupled to one or more processors and having instructions stored thereon which, when executed by the one or more processors, cause the one or more processors to perform operations for word salience determination of words in text data, the operations comprising:

receiving two or more electronic documents, each electronic document comprising text data, a second electronic document comprising a link to a first electronic document;

processing word representations of words of the first electronic document using a first encoder to provide first output and a context vector;

processing text data of the second electronic document and the context vector using a first decoder to provide second output;

determining, by an attention mechanism, a plurality of weights for each word in the text data of the first electronic document based on the first output, and the second output; and providing a word salience value for each word, a word salience value comprising a sum of weights of a respective word.

9. The computer-readable storage medium of claim 8, wherein the first encoder comprises a recurrent neural network (RNN) encoder, and the first decoder comprises a RNN decoder.

10. The computer-readable storage medium of claim 8, wherein operations further comprise providing a reconstruction of the first electronic document using a variational autoencoder to provide a comparison hidden vector for a reconstruction regularizer.

11. The computer-readable storage medium of claim 10, wherein the reconstruction regularizer supplements missing information in the second electronic document, and reduces an effect of noise from the second electronic document.

12. The computer-readable storage medium of claim 8, wherein operations further comprise using word salience values in a system to perform one or more of retrieval of electronic documents, and summarization of electronic documents on word salience values.

13. The computer-readable storage medium of claim 8, wherein each word representation comprises a distributed word vector mapped by a word embedding matrix that is initialized by pre-trained word embeddings.

14. The computer-readable storage medium of claim 8, wherein the first electronic document comprises an article, the second electronic document comprises a social media post.

15. A system, comprising:
   a computing device; and
   a computer-readable storage device coupled to the computing device and having instructions stored thereon which, when executed by the computing device, cause the computing device to perform operations for word salience determination of words in text data, the operations comprising:
      receiving two or more electronic documents, each electronic document comprising text data, a second electronic document comprising a link to a first electronic document;
      processing word representations of words of the first electronic document using a first encoder to provide first output and a context vector;
      processing text data of the second electronic document and the context vector using a first decoder to provide second output;
      determining, by an attention mechanism, a plurality of weights for each word in the text data of the first electronic document based on the first output, and the second output; and
      providing a word salience value for each word, a word salience value comprising a sum of weights of a respective word.

16. The system of claim 15, wherein the first encoder comprises a recurrent neural network (RNN) encoder, and the first decoder comprises a RNN decoder.

17. The system of claim 15, wherein operations further comprise providing a reconstruction of the first electronic document using a variational autoencoder to provide a comparison hidden vector for a reconstruction regularizer.

18. The system of claim 17, wherein the reconstruction regularizer supplements missing information in the second electronic document, and reduces an effect of noise from the second electronic document.

19. The system of claim 15, wherein operations further comprise using word salience values in a system to perform one or more of retrieval of electronic documents, and summarization of electronic documents on word salience values.

20. The system of claim 15, wherein each word representation comprises a distributed word vector mapped by a word embedding matrix that is initialized by pre-trained word embeddings.

* * * * *